US006292790B1

United States Patent
Krahn et al.

(10) Patent No.: US 6,292,790 B1
(45) Date of Patent: Sep. 18, 2001

(54) APPARATUS FOR IMPORTING AND EXPORTING PARTIALLY ENCRYPTED CONFIGURATION DATA

(76) Inventors: James E. Krahn, 900 W. Meander Ct., Eagle, ID (US) 83616; David K. Poole, 3017 N. 5 Mile, Boise, ID (US) 83713; Jody L. Terrill, 4027 N. Mint Ave., Boise, ID (US) 83703

(*) Notice: Subject to any disclaimer, the term of this patent is extended or adjusted under 35 U.S.C. 154(b) by 0 days.

(21) Appl. No.: 08/953,539

(22) Filed: Oct. 20, 1997

(51) Int. Cl.⁷ .................................................. G06F 17/60
(52) U.S. Cl. ......................... 705/50; 700/79; 713/151
(58) Field of Search .......................... 705/1, 50; 707/204, 707/10; 395/703, 51, 701; 380/4, 25, 3; 713/151, 155; 700/79

(56) References Cited

U.S. PATENT DOCUMENTS

| | | | |
|---|---|---|---|
| 5,175,800 | * 12/1992 | Galis et al. | 706/45 |
| 5,241,594 | * 8/1993 | Kung | 713/151 |
| 5,640,567 | * 6/1997 | Phipps | 713/3 |
| 5,721,924 | * 2/1998 | Kitadate | 395/703 |
| 5,742,677 | * 4/1998 | Pinder et al. | 380/242 |
| 5,778,395 | * 7/1998 | Whiting et al. | 707/204 |
| 5,812,398 | * 9/1998 | Nielsen | 713/200 |
| 5,819,296 | * 10/1998 | Anderson et al. | 707/204 |
| 5,883,956 | * 3/1999 | Le et al. | 713/170 |

FOREIGN PATENT DOCUMENTS

0887723-A2 * 12/1998 (EP).

OTHER PUBLICATIONS

Stevens, W. Richard, *Unix Network Programming* (Prentice–Hall, 1990), pp. 24–25.
Schneier, Bruce, *Applied Cryptography, Second Edition* (Wiley, 1996), pp. 30–31, 265–269, 435–436.
Wright, Gary R., *TCP/IP Illustrated, vol. 2* (Addison–Wesley, 1995), pp. 64–65.

* cited by examiner

*Primary Examiner*—James P. Trammell
*Assistant Examiner*—Thomas A. Dixon
(74) *Attorney, Agent, or Firm*—Ormiston & McKinney, PLLC

(57) ABSTRACT

An apparatus for importing and exporting computer based configuration data to and from text based files in which part of the data is encrypted for confidentiality. The apparatus allows the resulting text file to be selectively edited prior to an import, providing for flexibility on behalf of system administrators without compromising the security of encrypted data.

8 Claims, 3 Drawing Sheets

FIG. 1

| memory identifier | memory value | private or public | textual identifier | textual value |
|---|---|---|---|---|
| 1.3.7.1 | {4d,49,43,48,41, 45,4C,4A,0} "MICHAELJ" | public | User Name | MICHAELJ |
| 1.3.8.1 | {48,41,43,4b,0} "HACK" | private | Password | |
| 4.5.2.3 | {CF,44,9C,36} "207.68.156.54" | public | Server Ip Address | 207.68.156.54 |
| 5.3.2.2 | {56,50,4e,20,23, 31,0} "VPN #1" | public | System Name | VPN #1 |

350 355 360 370 375

345 configuration variable table 362, 362, 364, 366

FIG. 2

```
System Name=VPN #1
Server IP Address=207.68.156.54
User Name=MICHAELJ
Password=23 4A 1C 48 42 27 FC D4
```

380 persistent configuration text file 390, 395, 400, 405

APPARATUS FOR IMPORTING AND EXPORTING PARTIALLY ENCRYPTED CONFIGURATION DATA

REFERENCES

[1] Stevens, W. Richard, *Unix Network Programming* (Prentice-Hall, 1990), pages 24–25.

[2] *ExtendNet VPN Reference Guide* (Extended Systems Inc., June, 1997)

[3] Schneier, Bruce, *Applied Cryptography, Second Edition* (Wiley, 1996), pages 30–31, 265–269, 435–436

[4] Wright, Gary R., *TCP/IP Illustrated, Volume 2* (Addison-Wesley, 1995), pages 64–65.

FIELD OF THE INVENTION

This invention relates to an apparatus to import and export computer configuration data, part of which is confidential, to and from plain-text computer files.

BACKGROUND

Modern computing environments consist of computer networks with multiple servers for performing many varied functions. Often access to a server or other network resource is limited to users(clients) who can present proper credentials to the server. The process of identifying one's self to a computer system is generally known as authentication, and often consists of the client logging on to a system by entering a user name followed by a password. If the password entered in by the client matches that maintained in a list by the server, the user is considered authenticated, and is logged into the server. Authenticated clients are then allowed access to the resources and services provided by the particular server according to the privilege level associated with the user name.

Modern computer networks typically have multiple servers. On a computer network with multiple servers, it is often desirable to have multiple user name/password lists, and each server is generally associated with a single user name/password list. The user name/password lists are typically grouped with other server specific data. The collection as a whole represents the configuration data for a particular server.

For example, a remote access server is a device that allows remote users to access network computing resources from a remote site such as home or a customer site. The network itself generally has its own configuration data, including its own user name and password lists to authenticate users to the network at large. Thus in the general case, a remote user must authenticate to the remote access server, and then, having done that, gain access to the network itself.

Administering user name/password configuration files in a multi-server environment is difficult. It is desirable to be able to make backup copies of configuration data from each server that can be stored in a secure place on the network. The stored configuration file can be used to restore the configuration of a server that becomes corrupted. It sometimes is useful to replicate user/names and passwords across multiple servers when, for example, simultaneous user capacity is being increased by adding additional servers. The user/name password lists tend to be large and contain confidential passwords, making it impractical and undesirable to enter the data by hand, so the ability to transfer memory based server configuration data to a file is important. Such a file, however, poses security challenges, because certain configuration data, such as passwords, is confidential and should not be disclosed. One common solution for protecting passwords when written to a text file is to hash them with a one-way hash. Unix, for example, does not store the plain-text versions of passwords. Instead, Unix stores a one way hash of the password. The hashing algorithm is a well-known algorithm. When a password is presented by a user, it too is hashed with the same algorithm, and the hashes are compared to determine if the original passwords match. One limitation of one way hash schemes is that the original clear-text password is not preserved on the server which is undesirable if the plain-text password is needed for another server purpose, such as an encryption key for data files.

Another prior art solution to protect confidential passwords is to encrypt the entire configuration file; this solution suffers from the fact that the entire configuration file, including public data, is encrypted and thus unreadable and difficult to modify.

What is needed is a system for saving and restoring configuration data to and from a text file that permits editing of public configuration data, preserves the secrecy of private configuration data, and ensures that improperly modified text files by unauthorized persons are blocked from restoration on a server.

BRIEF SUMMARY AND OBJECTS OF THE INVENTION

It is an object of the present invention to provide an apparatus that allows system administrators to be able to save, restore, and replicate server configuration data such as user names and passwords into a text file without compromising the secrecy of the passwords and other secure data, and further, to allow the resulting text files to optionally be edited in part, and to be restored to the same or different virtual private network server in a secure way.

The present invention achieves this objective by introducing a novel system that allows user configuration data, including names and passwords, to be saved in a textual data file by an authorized, authenticated system administrator, who provides an additional encryption password for the data when the configuration file is created. Selected portions of the data, such as passwords and other confidential data, are encrypted prior to being written to the file. The remaining information is written in an unencrypted form. The public portion of the configuration file can be restored on any server by an administrator authenticated to that server, including an administrator who cannot provide the decryption password associated with the configuration file. The entire configuration file, including the private, encrypted data, can be restore on any server, providing that the administrator authenticated to that server also can provide the decryption password associated with the configuration file.

The present invention is particularly novel in the way it performs a restore when the data authentication fails because the system administrator cannot present the proper decryption password. The present invention discloses a system having a data decryption password associated with the configuration file, the decryption password is distinct from the authentication password needed to authenticate to a target server. Rather than simply deny a restoration if the data authentication fails, the present invention allows a system administrator authenticated to the server, but not to the data, to restore the public parts of a configuration file, thus allowing public configuration data to be replicated freely.

The present invention also allows configuration data to be selectively excluded from a restore.

BRIEF DESCRIPTIONS OF THE DRAWINGS

FIG. 1 shows a simplified example of a configuration variable table as it applies to the present invention.

FIG. 2 shows a simplified example of the text of a persistent configuration text file as it applies to the present invention.

Figure 4:
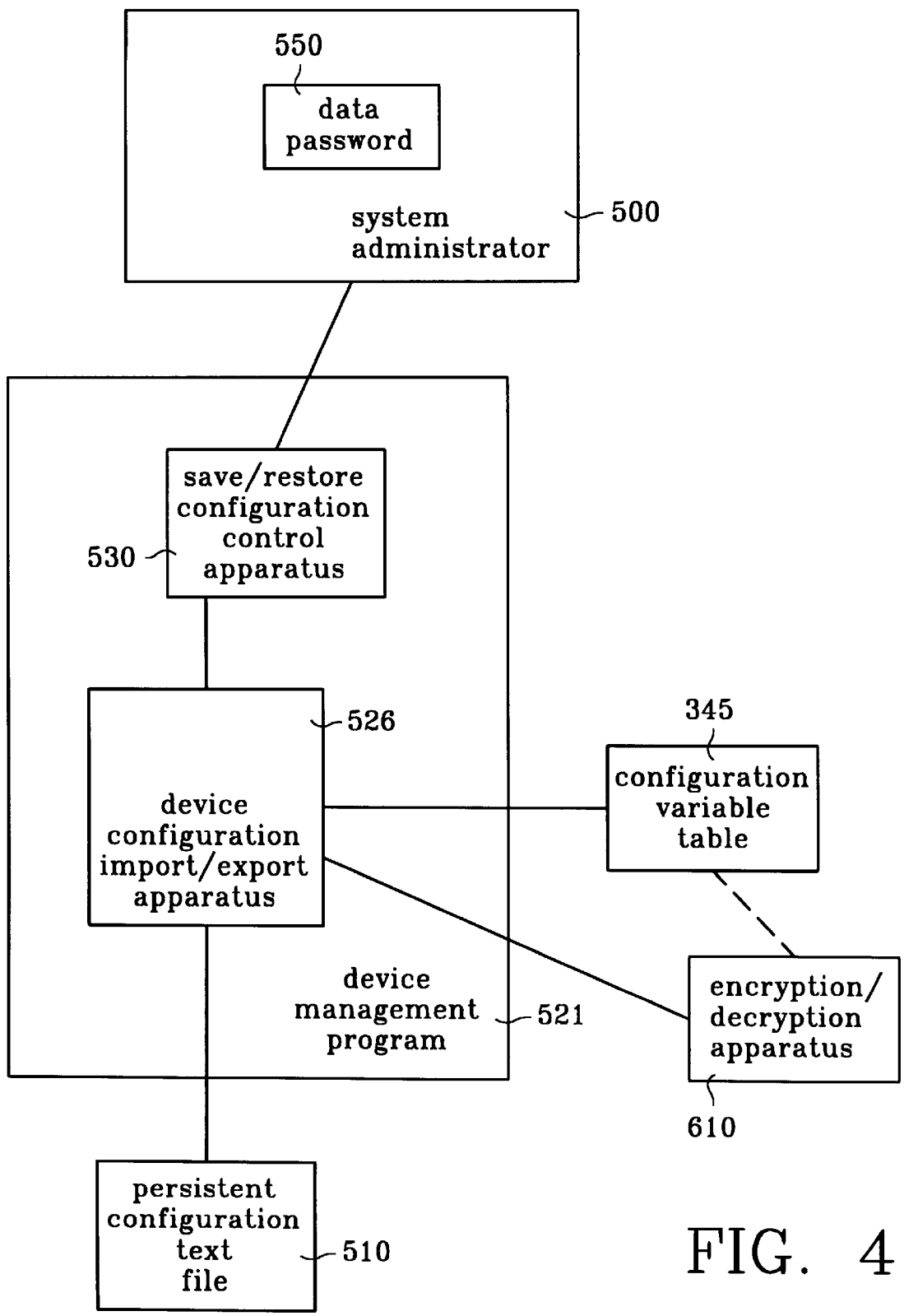

FIG. 4. is a block diagram of the present invention in a single device context.

DETAILED DESCRIPTION OF THE PREFERRED EMBODIMENT

FIG. 1 show a simplified representation of a memory-base configuration variable table. Each row represents a memory configuration variable, each column represent an attribute of the variable thus identified. The memory identifier column 350 contains a value for identifying the configuration variable to the server. The memory value column 355 contains the current value of the identified variable. The private or public flag column 360 distinguishes private data from public data. In FIG. 1., the data enclosed in brackets in memory column 355 denotes a binary representation of sample data, the data enclosed in quotation marks denotes the clear text representation of the binary data. The private or public column 360 is used primarily to distinguish private data that is to be encrypted before being written to a configuration file from public data, written in clear-text form. The preferred embodiment uses Simple Network Management Protocol(SNMP) [4] object identifiers for the memory identifiers 350. In the preferred embodiment, user passwords, the SNMP get community name, and the SNMP set community name are private data. The remaining configuration data is public. In the preferred embodiment the configuration variable table 345 illustrated in FIG. 1 is implemented logically as described, although some of the columns are implicit. In particular, the private or public column 360 is implicitly by code logic rather than an explicit table entry.

The textual identifier column 370 denotes the textual name of the variable used to identify the variable in a configuration text file. The textual value 375 denotes the textual value of the variable as it would appear in a textual configuration file. Note that for the three public variables in FIG. 1, the textual value 375 corresponds to the clear-text value of the memory variable 355. The only private variable 360 in FIG. 1 is password, its textual value 375 is an encrypted form of the clear text value 355.

Figure 3:
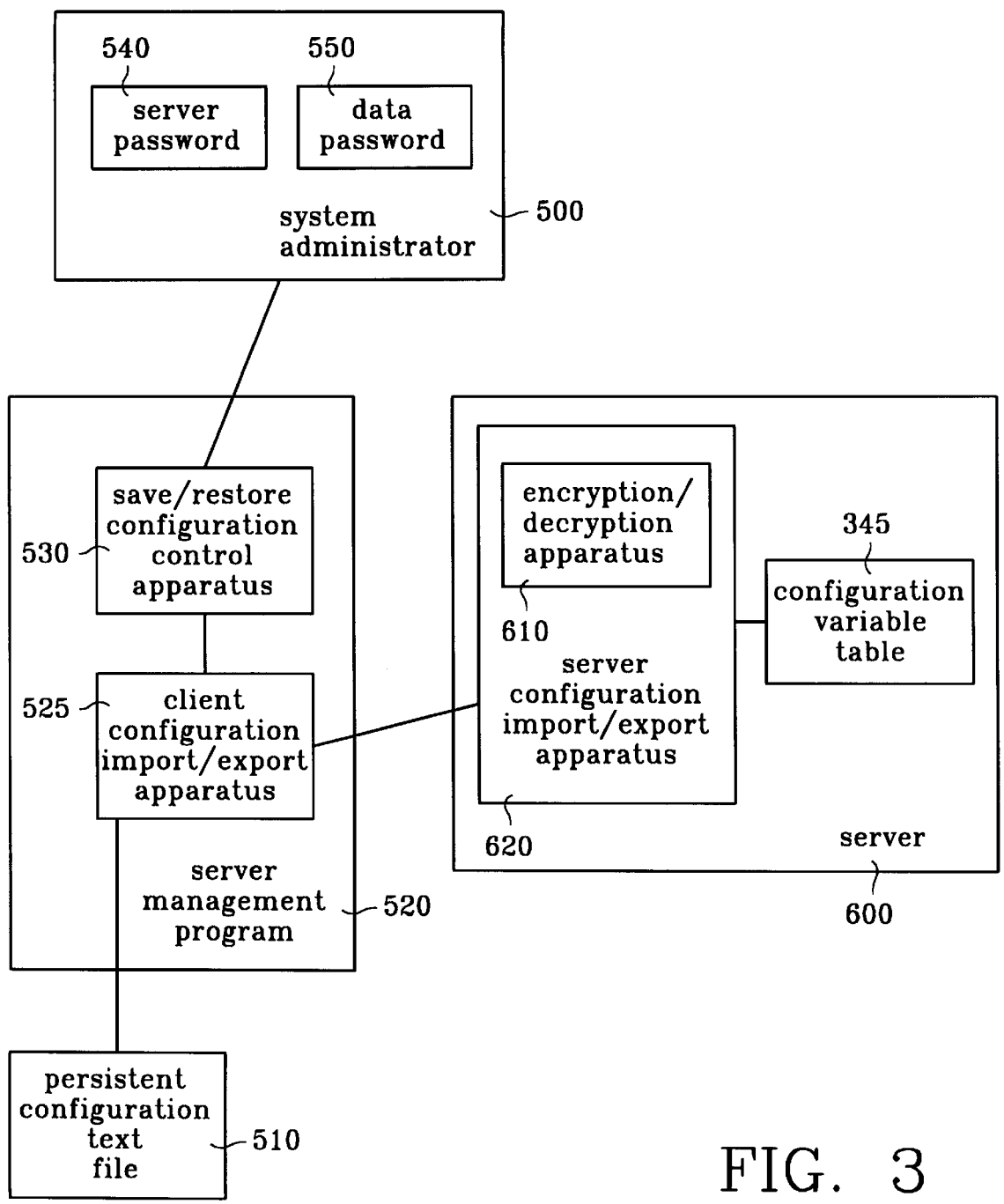
FIG. 3 is a block diagram of the present invention in a client-server context.

FIG. 3 is a block diagram that generally shows the preferred embodiment. The perferred embodiment is generally implemented as the ExtendNet VPN 1000 [2], a commercial product. The ExtendNet VPN includes both a discrete Virtual Private Network (VPN) server and a server management utility commercially known as InterprEYES. In the preferred embodiment, the server 600 is a VPN server.

The configuration variable table 345 of the preferred embodiment contains numerous variables including general configuration variables such as the system name, the system contact, the system level, a trace level for debug purposes, the admin console IP address, the admin console IPX network, and the admin console IPX node. The configuration variable table 345 in the preferred embodiment also contains a network configuration section, including a user authentication code, and a packet compression bitmask. The configuration variable table 345 in the preferred embodiment also contains a variable for each user having permission to use the VPN. Each user configuration variable includes a user name, user password, a web access flag, and an account disabled flag. The configuration variable table 345 in the preferred embodiment also contains a server TCP/IP configuration section, including an IP address, a subnet mask, a default gateway, a connection timeout checking flag, a firmware update TFTP port, and a boot protocols section variable. The configuration variable table 345 in the preferred embodiment also contains a client TCP/IP configuration section including a client TCP/IP enable flag, a cleint-to-client communication flag, and address source variable to indicate whether client ip address come from an internal table or form a DHCP server, the primary DNS server IP address, the secondary DNS server IP address, the primary NetBios name server IP address, the and secondary NetBios name server IP address. The configuration variable table 345 in the preferred embodiment also contains a IPX configuration section including an IPX enable flag, an IPX frame format variable, a SAP interval variable, a client enable flag, a client network number variable, and a client-to-client communication flag. The configuration variable table 345 in the preferred embodiment also contains SNMP configuration section including the trap community name, the get community name, and the set community name. The configuration variable table 345 in the preferred embodiment also contains a trap configuration section including an urgent traps bitmask, a warning traps lists, an information traps list, and a debug traps list.

In the preferred embodiment, the encryption/decryption apparatus 610 is a software routine deploying well known encryption algorithm Data Encryption Standard DES [4], and the encryption key is the data password 550. The server configuration import/export apparatus 620 is a software routine that resides within the server 600. The server configuration import/export apparatus 620 is an SNMP [4] handler, which responds to read/write requests for individual SNMP variables, each SNMP variable is defined by an object identifier descripter (OID). During an export, upon a proper request via the SNMP interface, the server configuration import/export apparatus 620 receives an SNMP request containing an OID corresponding to a memory identifier 350 of the configuration variable table 345. The corresponding memory identifier 350 and the corresponding textual value 375 are wrapped in an SNMP packet and transmitted via SNMP to the client import/export apparatus 525. The public variables are transmitted in clear text; the private variables are encrypted by the encryption/decryption apparatus 610, which is a software implementation of the well known 56 bit DES encryption algorithm. As a security measure, private data is return via SNMP only if the server 600 is put into a private data manipulation mode via a special SNMP call. Thus, if a general SNMP client will not be able to retrieve any private data, (even though the data would be encrypted), private data transmission is intended to be limited to the server management program 520.

The server management program 520 is a Window 95/Windows NT application program. The save/restore configuration control apparatus 530 of the preferred embodiment is a Windows menu selection, well known in the art. Specifically the menu selection "File—Export Configuration" for configuration export and "File—Import Configuration" for configuration import.

In the preferred embodiment, the server password 540 is a SNMP get/set community name pair and the data password 550 is arbitrarily chosen by an authenticated system administrator 500 at the time of an export.

The client configuration import/export apparatus 525 also can optionally contain a mechanism to selectively prohibit the restoration of certain variables. This mechanism is useful in situations where a full restore would change system variables such as server passwords and addresses that are preferably left unchanged in some restorations. The mechanism typically consists of an internal table and a menu means for the system administrator 500 to identify the variables to be excluded from a restore. The table is then applied against each variable prior to it being sent to the server 600, those variables within the table are not transmitted.

OPERATION OF THE PREFERRED EMBODIMENT

Referring to FIG. 3, to save a persistent configuration text file 510, a system administrator 500 executes the server management program 520. The system administrator 500 must present the server password 540 to authenticate to the server 600, which in the preferred embodiment is a VPN server. Once authenticated, the system administrator 500 then invokes the save/restore configuration control apparatus 530 of the server management program 520. The system administrator 500 provides a data password 550 and a file name for the persistent configuration text file 510. In the preferred embodiment, the data password 550 serves both as an encryption/decryption key. The save request is transmitted to the configuration import/export apparatus 620 of the VPN server 600 via the SNMP protocol. The server configuration import/export apparatus 610 then initiates an export. The textual value 375 for each private variable is computed by encrypting the plain-text value 355 within the server 600 into an encrypted textual value 375 using the encryption/decryption apparatus 610 using an encryption key derived from the data password 550. In the preferred embodiment, the encryption/decryption apparatus 610 is a software routine deploying well known encryption algorithm DES, and the encryption key is the data password 550.

In the preferred embodiment, the client configuration import/export apparatus 525 performs the following steps when export is selected. First, the system administrator 500 is prompted via a dialog box to enter the data password 500, then prompted to re-enter the passwords for verification. Next, the system administrator 500 is prompted to enter the configuration file 510 name. The export file is opened for output. An MD4 hash digest signature of the data password 550 is written to the configuration file 510 in a textual form. The client/configuration import/export apparatus 525 contains a number of internal tables, each internal table corresponding to each section within the persistent text file 510. Each table entry consists of an SNMP object identifier descriptor (OID), a data type, and a list of enumeration constants.

As a security measure, the SNMP interface, by default, will allow private data to be read or written (even though private data, when returned, is encrypted). The client configuration import/export apparatus sends a special SNMP call to turn on private data manipulation. After the export is complete an analogous SNMP call turns off private data manipulation.

Private data manipulation is turned on. Code for each table is invoked. For each section, section headers are written. For each variable in each table, an SNMP request call containing the oid of the variable is issued. When the data is returned, the data type and the enumeration constants are used to format the response into a suitable format. After formatting, each variable is written to the configuration file 510. Each variable to is written the configuration file 510 using the textual identifier 370, followed by an equal sign, followed by the textual value 375, in a file format similar to Windows INI files. After the final section is written, the configuration file 510 is closed, and private data retrieval is turned off.

A configuration variable table 345 is restored analogously to the way it is saved. To restore a file on the same or different server 600, the system administrator 500 must first authenticate to the target server 600 by providing the server password 540 to the server 600 using the server management program 520. A restore command is issued through the server management program 520 via a menu command. The administrator 500 must then present the file name of the persistent configuration text file 510 and the data password 550, which in the preferred embodiment also serves as the decryption key. In the preferred embodiment the encryption key, decryption key, and the data password 550 are identical but in general for some encryption/decryption methods they need not be, as long as the encryption key and the decryption key can be derived from the data password 550. The save/restore configuration control apparatus hashes the data password 550 provided by the system administrator 500 into a digest form (using MD4 in the preferred embodiment) and compares this new digest against the digest in the configuration file 510. If the digests match, the system administrator 500 has entered the proper data password 550 and is authenticated and thus can import all the configuration data, including the private data. If the digests do not match, the administrator 500 is not authenticated to the data in the persistent configuration text file 510, and thus can only import memory values in sets that have no private variables. In the preferred embodiment, the non-data authenticated system administrator can import neither user names nor passwords. If the system administrator 500 is authenticated to the data, the data password 550 is transmitted to the encryption/decryption apparatus 610 of the server configuration import/export apparatus 620 by a special SNMP call.

In the preferred embodiment, a section of the persistent configuration text file 510 is processed at a time. The section header is used to locate the corresponding internal section table. Variable data for that section is read from the persistent configuration text file 510. The save/restore configuration control apparatus 530 validates that the particular variable belongs to the section. The save/restore configuration control apparatus 530 formats the value received from the persistent configuration text file 510 using the data type and enumeration constants from its internal tables into a format suitable for SNMP transmission and transmits the OID and the formatted value to the server configuration import/export apparatus 620. The encryption/decryption apparatus 610 of the server 600 decrypts the private data, and the server configuration import/export apparatus 620 updates the configuration variable table 345 to complete the restore operation. In the case of a system administrator that fails to authenticate with the data password 550, the save/restore configuration control apparatus 530 will refrain from sending any variables sets having encrypted data.

In the preferred embodiment, SNMP is used because of it common acceptance within the industry. However, an alternate embodiment would be as security improvement to encrypt the data password 550 with the SNMP set community name, and then use a secure transport such as secure sockets or the forthcoming SNMP II.

The persistent configuration text file 510 may be modified between save and restore times. Anyone who has edit access to the configuration file 510 can delete entries from the file. Anyone who has edit access to the configuration file 510 can add or modify public data. Private data can only be added by someone having edit access to the file who can also provide the correct data password 550. For example, a second persistent configuration text file 510' from a different server 600' could be generated using the same data password 550 (which would result in the same encryption key). The user names/passwords from the second file 510' could be imported/edited into the first configuration file 510, and if restored with the proper data password 550, the new records would also be imported to a target server 600.

ALTERNATE EMBODIMENT

The preferred embodiment as show in FIG. 3 is based on the client server model where the functionality is split between a client computer and a server computer. An alternate embodiment is shown in FIG. 4. In this embodiment, the invention is illustrated in a single device context. In this alternate embodiment, a single device configuration apparatus 526, contained within the server management program 520, replaces the client import/export apparatus 525 and the server configuration import/export apparatus 620 of FIG. 3 and operates on a configuration variable table 345 which generally is a software device that operates on the same computing device as the server management program 520. Alternately, the configuration variable table 345 is contained with a discrete, separate device, connected to the device configuration import/export apparatus 526 through any standard computer connectivity mechanism such as serial port, a bus interface, a network, a parallel port, and infrared or other wireless connection and the like.

The preferred embodiment described herein is not intended to limit the scope of the invention as claimed, but rather is intended to teach those skilled in the art how to make and use the preferred embodiment of the claimed invention. The present invention may be embodied in other specific forms without departing from its spirit or essential characteristics, thus the described embodiment is to be considered in all respects illustrative, not restrictive.

We claim:

1. A configuration export apparatus for enabling a system administrator having a data password to export configuration data to a persistent configuration text file, the configuration export apparatus comprising:

an encryption apparatus configured to derive an encryption key from the data password;

a save configuration control apparatus configured to select an export operation;

a configuration variable table having at least one configuration variable set, each configuration variable set having at least one configuration variable, each configuration variable having:
a memory identifier,
a memory value,
a textual identifier, and
a textual value,
each configuration variable being denoted as either a private variable or a public variable;

a server configuration export apparatus in operative communication with the encryption apparatus and the configuration variable table, the server configuration export apparatus being configured to derive the textual value of each configuration variable from the memory value of the public configuration variable;

wherein the encryption apparatus is further configured to encrypt the textual value of each configuration variable denoted as a private variable using the encryption key; and a client configuration export apparatus in operative communication with the save configuration control apparatus and the server configuration control apparatus, the client configuration export apparatus being configured to receive the data password and a file name of the persistent configuration text file, hash the data password into a textual hashed digest, write the textual hashed digest to the persistent configuration text file, and for each configuration variable in the configuration variable table, receive the textual identifier and the textual value from the server configuration export apparatus, write the textual identifier and the textual value to the persistent configuration text file, and textually associate the memory identifier and the textual value in the persistent configuration text file.

2. A configuration import apparatus for enabling a system administrator having a data password to import configuration data from a persistent configuration text file, the persistent configuration text file having a textual hashed digest and at least one textual configuration variable, each textual configuration variable being denoted as public or private and having a textual identifier and a textual value, the configuration import apparatus comprising:

a restore configuration control apparatus being configured to select an import operation, authenticate the data password, and selectively retrieve the private and/or public textual configuration variables from the persistent configuration test file;

a decryption apparatus in operative communication with the restore configuration control apparatus, the decryption apparatus being configured to derive a decryption key from the data password and to decrypt the textual value of each private textual configuration variable retrieved by the restore configuration control apparatus using the decryption key;

a configuration variable table having at least one configuration variable set, each configuration variable set having at least one configuration variable, each configuration variable having:
a memory identifier,
memory value,
a textual identifier, and
a textual value,
each configuration variable being denoted as either a private variable or a public variable;

a server configuration import apparatus in operative communication with the restore configuration control apparatus, the decryption apparatus, and the configuration variable table, the server configuration import apparatus being configured, for each textual configuration variable retrieved by the restore configuration control apparatus, to derive the memory value from the textual value of the textual configuration variable, and to update the corresponding public and private configuration variables in the configuration variable table if the data password is authentic or to update only the public configuration variables if the data password is not authentic.

3. A configuration import/export apparatus for enabling a system administrator having a data password to import and export configuration data to and from a persistent configuration text file having a textual hashed digest and at least one textual configuration variable, each textual configuration variable further comprising a textual identifier and a textual value, the configuration import/export apparatus comprising:

a save/restore configuration control apparatus configured to select either an import or an export operation, and during an import operation to authenticate the data password and selectively retrieve the private and/or public textual configuration variables from the persistent configuration test file;

a memory configuration table having at least one configuration variable set, each configuration variable set having at least configuration variable, each configuration variable having:
memory identifier,
a memory value,
a textual identifier, and
a textual value,
each configuration variable being denoted as either a private variable or a public variable;

an encryption/decryption apparatus being configured to derive an encryption/decryption key from the data password, and to selectively encrypt the textual value of each private configuration variable during an export operation or decrypt the textual value during an import operation;

a server configuration import/export apparatus in operative communication with the encryption/decryption apparatus, the save/restore configuration control apparatus, and the configuration variable table, the server configuration import/export apparatus being configured, for each public and/or private configuration variable, to selectively derive the textual value from the memory value of the configuration variable, during an export operation or to derive the memory value from the textual value of the configuration variable and update the corresponding values of the configuration variable table during an import operation; and a client configuration import/export apparatus in operative communication with the save/restore configuration control apparatus and the server configuration control apparatus, the client configuration import/export apparatus being configured, during an export operation, to selectively receive the data password and a file name of the persistent configuration text file, hash the data password into a textual hashed digest, write the textual hashed digest to the persistent configuration text file, and for each configuration variable in the configuration variable table, receives the textual identifier and the textual value from the server configuration import/export apparatus, write the textual identifier and the textual value to the persistent configuration text file, and textually associate the memory identifier and the textual value in the persistent configuration text file.

4. The configuration import/export apparatus of claim 3, further comprising a server, wherein the server contains the server configuration import/export apparatus and the encryption/decryption apparatus.

5. The configuration import/export apparatus of claim 4, wherein the server is a virtual private network server.

6. The configuration import/export apparatus of claim 5 wherein the encryption/decryption apparatus utilizes a DES algorithm.

7. A configuration export apparatus for enabling a system administrator having a data password to export configuration data from a configuration variable table data to a persistent configuration text file, the configuration export apparatus comprising:

a save configuration control apparatus configured to initiate an export operation and poll the system administrator for the data password;

a server configuration export apparatus in operative communication with the save configuration control apparatus, the server configuration export apparatus configured to selectively retrieve each configuration variable from the configuration variable table;

an encryption device in operative communication with the server configuration export apparatus, the encryption device configured to selectively encrypt each private configuration variable retrieved by the server configuration export apparatus; and a client configuration export apparatus in operative communication with the server configuration export apparatus and the save configuration control apparatus, the client configuration control apparatus configured to encrypt the data password, to selectively receive each configuration variable from the server configuration export apparatus, and to write the encrypted data password and each configuration variable to the persistent configuration text file.

8. A configuration import apparatus for enabling a system administrator having a data password to import configuration data from a persistent configuration text file to a configuration variable table, the persistent configuration text file having an encrypted data password and at least one configuration variable being denoted as public or private, the configuration import apparatus comprising:

restore configuration control apparatus configured to poll the system administrator for the name of the persistent configuration text file and the data password, to authenticate the data password against the encrypted data password in the persistent configuration text file and to selectively retrieve each configuration variable from the persistent configuration text file;

a decryption apparatus in operative communication with the restore configuration control apparatus, the decryption apparatus configured to selectively decrypt the private configuration variable if the data password is authentic; and a server configuration import apparatus in operative communication with the decryption apparatus and the restore configuration control apparatus, the server configuration control apparatus configured to selectively update the configuration variable table with each public and decrypted private configuration variable retrieved from the persistent configuration text file if the data password is authentic or to selectively update the configuration variable table with only each public configuration variable retrieved from the persistent configuration text file if the data password is not authentic.

* * * * *